Nov. 6, 1934.    I. H. FREESE    1,980,047
GLASS FORMING MACHINE
Original Filed March 25, 1926    7 Sheets-Sheet 1

Fig.1.

Inventor
Ira H. Freese
By Eccleston & Eccleston
Attorneys

Nov. 6, 1934.     I. H. FREESE     1,980,047

GLASS FORMING MACHINE

Original Filed March 25, 1926     7 Sheets-Sheet 3

Inventor
Ira H. Freese

By Eccleston + Eccleston
Attorneys.

Nov. 6, 1934.  I. H. FREESE  1,980,047

GLASS FORMING MACHINE

Original Filed March 25, 1926  7 Sheets-Sheet 4

Fig.5.

Inventor

Ira H. Freese

By Eccleston + Eccleston

Attorney

Nov. 6, 1934.  I. H. FREESE  1,980,047
GLASS FORMING MACHINE
Original Filed March 25, 1926    7 Sheets-Sheet 7

Fig. 8.

Inventor
Ira H. Freese

By Eccleston & Eccleston
Attorneys

Patented Nov. 6, 1934

1,980,047

UNITED STATES PATENT OFFICE 1,980,047

GLASS FORMING MACHINE

Ira H. Freese, Clarksburg, W. Va., assignor to Hazel-Atlas Glass Co., Wheeling, W. Va., a corporation of West Virginia Original application March 25, 1926, Serial No. 97,396. Divided and this application March 15, 1932, Serial No. 599,025

6 Claims. (Cl. 49—5)

This application is a division of Freese and Dawson application, Ser. No. 97,396, filed March 25, 1926. The complete specification and drawings of the original application are reproduced in this divisional application, but it is to be understood that the particular features disclosed in the original Freese and Dawson application, which are the sole invention of Ira H. Freese, are briefly set forth in the following objects of invention, and are defined by the appended claims.

One of the objects of the present invention consists in mounting the reciprocable feeder plug and its operating mechanism, together with the shears and the operating mechanism therefor, directly on the forming machine, thereby rendering portable, as a single unit, the forming machine and its feeding mechanism.

Another object of the invention is to provide an extremely simple mechanism by which a single gob, or a plurality of gobs, may be fed to the mold in accordance with the requirements of the ware being manufactured.

Referring to the drawings.

Figure 2:
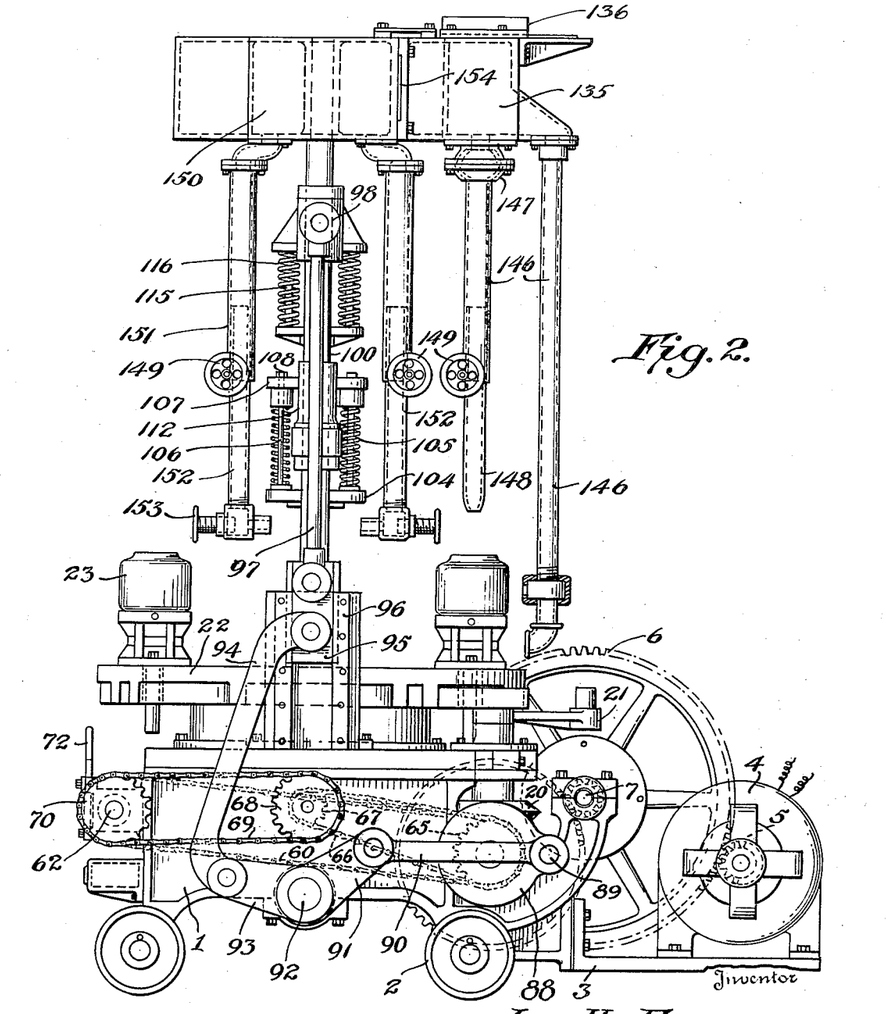
Figure 2 is a side elevational view of the machine, various well known parts having been omitted also from this figure.
Figure 5:
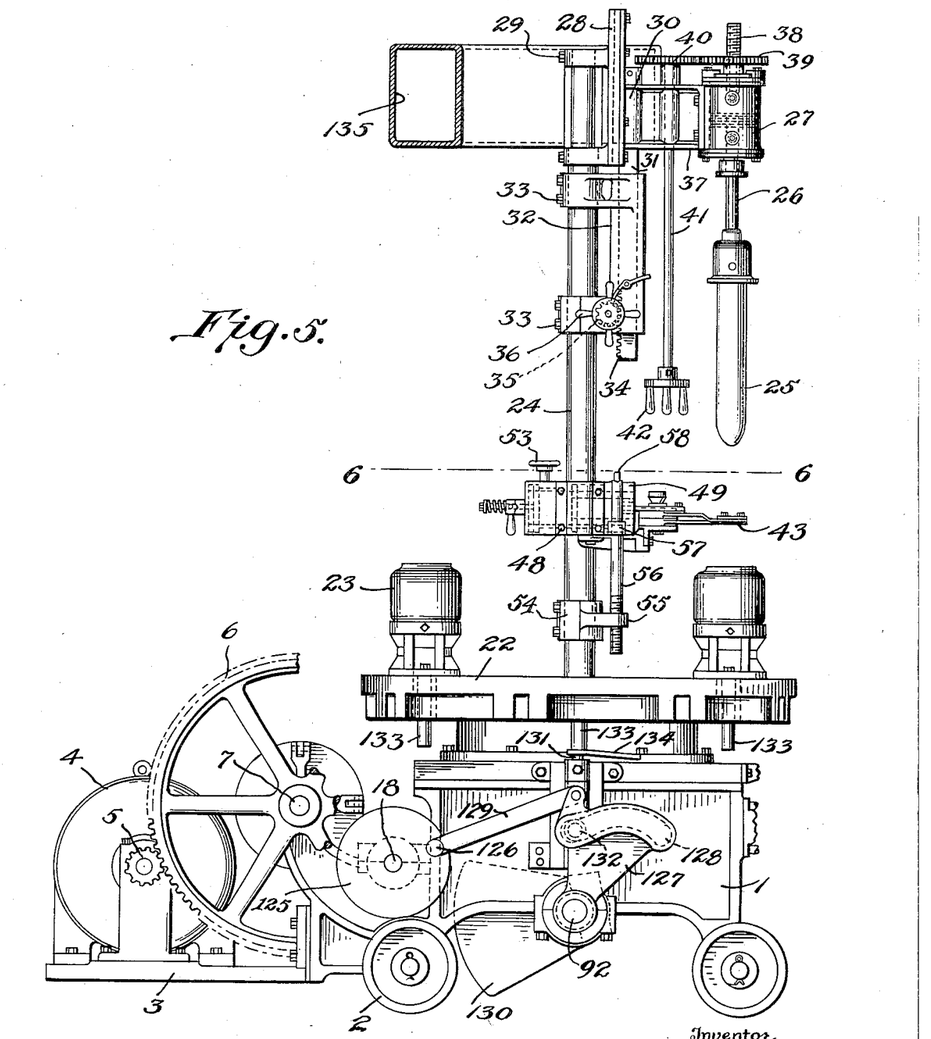
Figure 5 is an elevational view of the machine, and showing particularly the feeder mechanism, the shears, and the means for lifting the ware from the molds.
Figure 6:
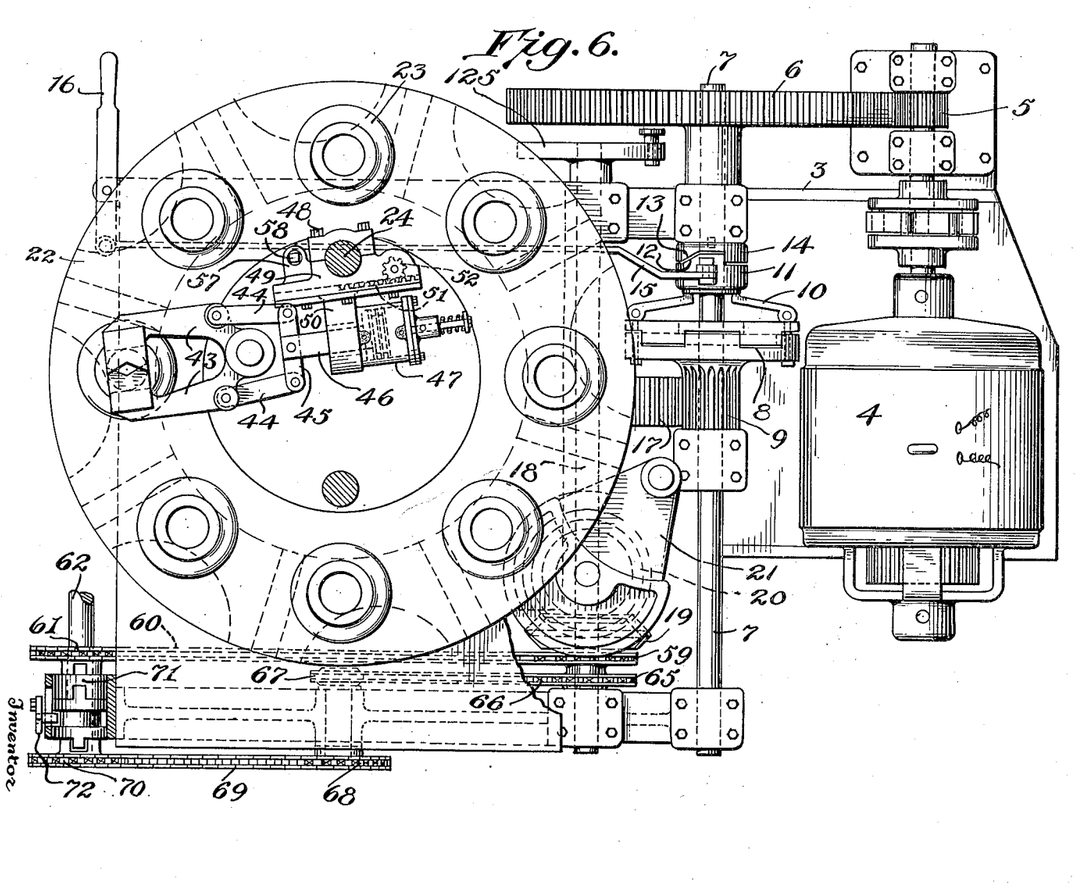
Figure 6 is a horizontal sectional view taken on line 6—6 of Figure 5, and showing particularly the shears, and operating mechanism therefor and the means by which they are mounted on the machine, and also showing the driving mechanism for the forming machine; other parts being omitted from the drawing for the sake of clearness.

Referring to the drawings more in detail, numeral 1 indicates the frame of the machine, which is preferably mounted on rollers 2. The driving mechanism is best illustrated in Figures 2, 5 and 6, and by reference to those figures it will be seen that a bracket 3 is rigidly attached to the machine frame, and mounted on the bracket is a motor 4, for driving various parts of the apparatus. The motor shaft carries a pinion 5 meshing with the large gear 6 fixed to the shaft 7. A friction clutch 8 is mounted on the shaft 7 and carries the pinion 9. The friction clutch is operated by cam fingers 10; which fingers are operated by the rotation of the disk 11 having the beveled surface 12 which cooperates with the beveled surface 13 of the fixed member 14. The disk 11 is rotated by means of a link connection 15 with the operating lever 16. Thus by the operation of the lever 16 the entire machine may be thrown into or out of operation. Obviously, any preferred form of friction clutch and operating means therefor, may be employed, and as the particular clutch shown herein forms per se no part of the invention, it is unnecessary to describe any details of the construction. The particular clutch and its operating mechanism, shown herein, is quite similar to the clutch mechanism disclosed in the patent to Strub #947,204, dated January 18, 1910.

The pinion 9 meshes with a gear 17 fixed to the main drive shaft 18. This shaft carries a bevel gear 19 which meshes with the bevel 20 to operate a Geneva wheel 21. The rotary mold table 22, carrying molds 23, is given an intermittent, or step-by-step, rotary motion, by means of the Geneva wheel 21; and as this means of intermittently rotating the mold table is so well known, and is in such common use, it is deemed unnecessary to describe the details of the construction.

As the mold table rotates step-by-step, the molds are successively brought to the charging station, then the pressing station, etc. As the first step in the formation of the glass ware is the feeding of the glass to the molds, we shall first describe the feeding mechanism, the shears for severing the gobs, and the means by which the feeding mechanism and shears are mounted on the machine.

Figure 8:
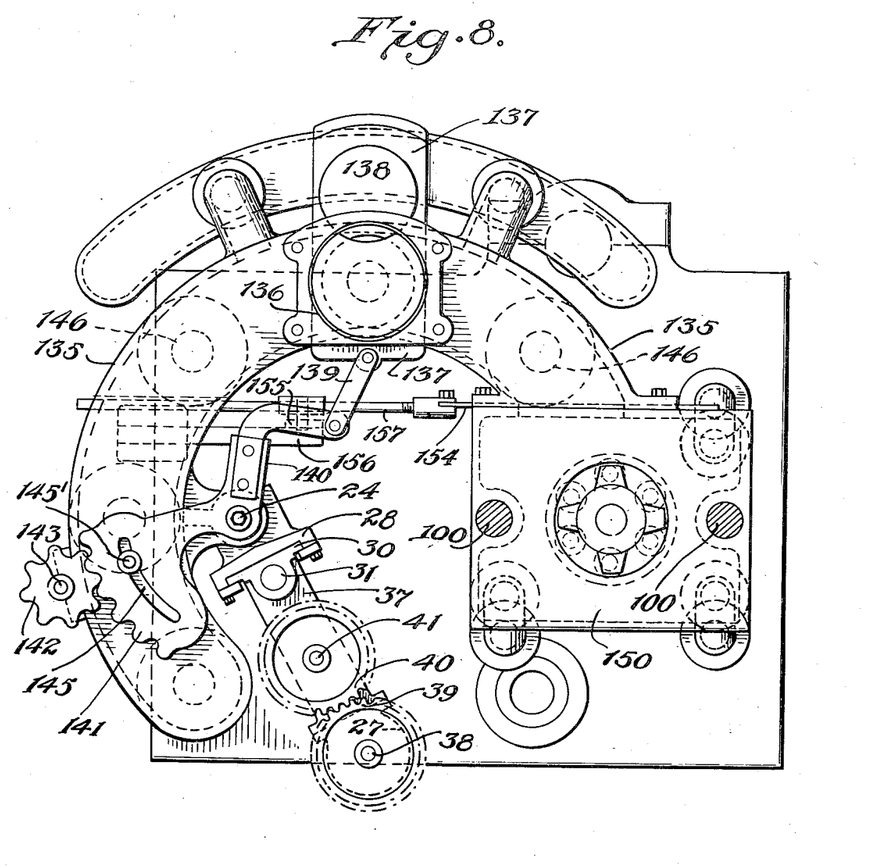
Figure 8 is a plan view of the wind boxes and the mechanism for operating the valves associated therewith.

Referring particularly to Figures 5 and 8, numeral 24 indicates a fixed standard supported by the frame of the machine, and on this standard the feeder mechanism and shears are mounted. The particular feeding mechanism shown herein is substantially the same, in many respects, as that disclosed in the patent to Stenhouse #1,542,013, granted June 16, 1925, and this feature of the present invention relates not to the particular feeding mechanism, but to the combination of the feeder mechanism mounted directly on the forming machine.

The well known reciprocating feeder plug is indicated by numeral 25; and when the forming machine is in operative relation with a melting tank, the plug will be positioned in the flow spout (not shown) and in vertical alignment with the usual flow orifice. The plug is carried by a piston rod 26 operated by a cylinder 27. The means by which the plug and the operating cylinder are bodily adjusted vertically, will now be described.

A slide bracket 28 is mounted on the standard 24 by means of cap screws 29, and arranged for vertical adjustment within the slide bracket 28 is a slide 30. This slide is vertically adjusted by means of a rod 31 which has its upper end attached to the slide, and which has its lower end mounted in a guide bracket 32; the guide bracket being secured to the standard 24 by means of cap screws 33. The lower portion of the rod 31 is formed into a rack 34, which is engaged by a gear 35, operated by hand wheel 36. It is thus apparent that by the rotation of the hand wheel 36, the slide 30 will be raised or lowered to the desired extent. Rigidly attached to the slide 30 is a bracket 37, and rigidly attached to the bracket 37 is the feeder plug operating cylinder 27. So that when the slide 30 is raised or lowered, the cylinder 27 will also be raised or lowered, thereby vertically adjusting the position of the feeder plug 25 with respect to the flow orifice in the flow spout. By means of the foregoing adjustment both limits of stroke of the plug are simultaneously adjusted in the same direction, either upwardly or downwardly.

For the purpose of independently adjusting the upper limit of the plug stroke, a rod 38 is threaded into the upper end of the cylinder 27, and keyed on the rod is a gear 39. Meshing with the gear 39 is a gear 40, which is attached to a shaft 41 rotatably supported in the bracket 37, and extending downwardly to an accessible position for operation. A hand wheel 42 mounted on the lower end of the shaft 41, provides a convenient operating means. Thus by the rotation of the hand wheel 42 the rod 38 is raised or lowered in the cylinder 27, thereby raising or lowering the upper limit of the feeder plug stroke.

It will be observed that the entire feeding mechanism is secured to the standard 24 by means of cap screws 29 and 33, and it is thus apparent that by loosening these cap screws the feeder plug and its operating cylinder may be circumferentially adjusted about the standard 24, thereby providing a convenient means for adjusting the plug laterally in the flow spout to bring it into true alignment with the flow orifice.

As stated hereinbefore, the particular structure of this feeder is shown in the patent to Stenhouse, and the novelty of this feature of the present invention resides in the combination of a feeder with a forming machine. When the forming machine and feeder are thus combined it is apparent that the necessity for a feeder for each flow spout is eliminated. Also the forming machine and feeder mechanism will remain in proper timed relation, when the combined unit is moved from one tank to another.

The construction of the shears and the means by which they are mounted on the forming machine, will now be described.

Referring particularly to Figures 5 and 6, the shears for severing the suspended gobs to be dropped into the molds, are indicated by numeral 43. The shear blades are pivotally connected, as shown in Figure 6, and pivotally attached to the shears are links 44; the links 44 being pivotally attached, at their opposite ends, to the crosshead 45 secured to the piston rod 46 of the operating cylinder 47.

Clamped about the standard 24, by means of cap screws 48, is a slide bracket 49; and mounted in the slide bracket is a slide 50 carrying the cylinder 47. The slide 50 is provided with a rack 51, and meshing with the rack is a gear 52 operated by the hand wheel 53. Thus by rotation of hand wheel 53, the operating cylinder and shears may be moved longitudinally, either backward or forward, to bring the shears into the desired position with respect to the glass stream and molds. Further, the bracket 49 is clamped to the standard 24 by means of cap screws 48, and consequently by loosening these screws the bracket together with the cylinder and shears may be adjusted circumferentially of the standard, thereby providing a further adjustment to bring the shears into proper position with respect to the glass stream and molds. Further, it is often desirable to adjust the shears vertically, so that the formed gobs will be severed at the desired point. For accomplishing this adjustment we have mounted a bracket 54 on the standard 24, and a lug 55 extending therefrom is tapped to receive the threaded rod 56. This rod passes upwardly through a lug 57 attached to the bracket 49, and has its upper end squared, as indicated by numeral 58, to receive a wrench or hand wheel for operating the rod. Obviously the rod 56 is rotatable in the lug 57, but is held against longitudinal movement with respect thereto. By rotation of the rod 56, the bracket 49 will be raised or lowered, and carrying with it the operating cylinder and the shears, and thereby adjusting the shears vertically to sever the gobs at the desired point.

I have thus far described the complete mechanism for feeding the glass gobs and for shearing them, various adjustments to properly align the plug with the flow orifice, various means for adjusting the plug to vary the size and shape of the gobs, various adjustments for the shears, and the means by which the complete feeding and shearing apparatus is mounted on the forming machine to form a combined feeding and forming machine.

In some circumstances, however, it is desirable to feed a plurality of gobs to each mold, instead of feeding a single gob thereto; and I shall now describe a very simple mechanism by which a single gob feed may be instantly converted into a plural gob feed, and vice versa.

Figure 1:
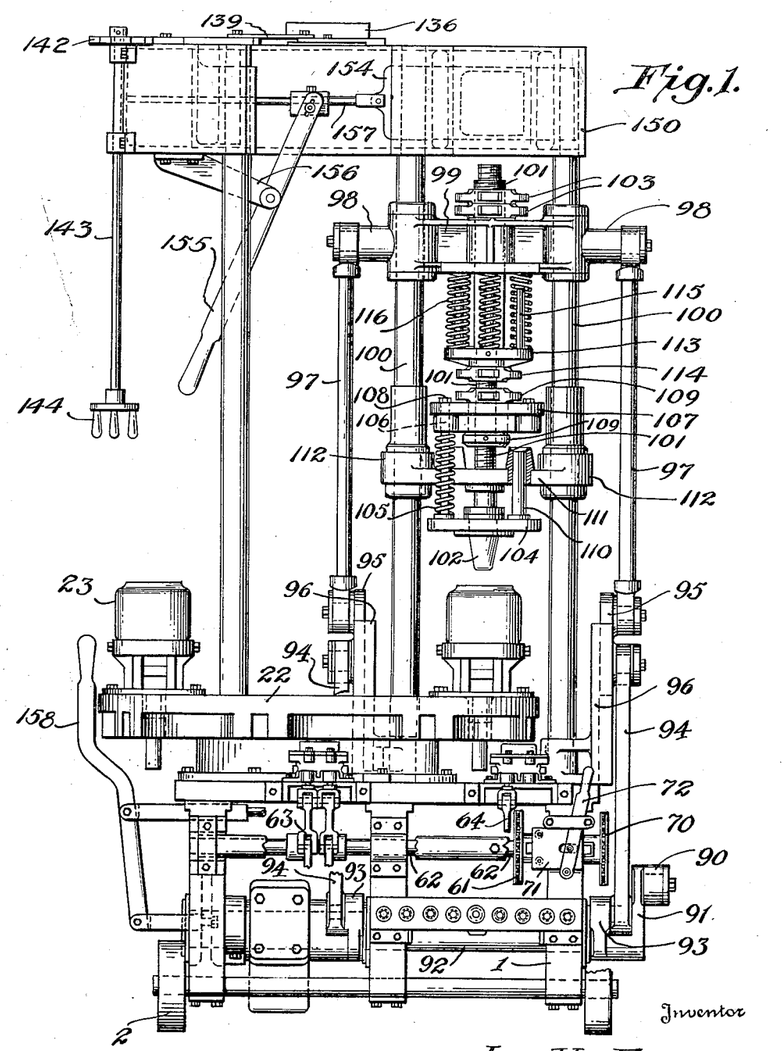
Figure 1 is a front elevational view of the machine, various elements which are well known and common in practice, having been omitted from the drawing.

Referring particularly to Figures 1, 2 and 6, numeral 59 indicates a sprocket wheel fixed to the main drive shaft 18, and a sprocket chain 60 connects this sprocket wheel with another sprocket wheel 61, of the same diameter and loosely mounted on the shaft 62. This shaft carries valve operating mechanism, indicated by numerals 63 and 64, for operating the valves controlling the cylinders 27 and 47, respectively. The valve operating means and the valves are old and well known, and per se form no part of the present invention. Accordingly it is unnecessary and undesirable to illustrate and describe the specific construction thereof.

In the apparatus thus far described the shaft 62 will rotate at the same speed as the main drive shaft, due to the sprocket chain connection between the two sprockets 59 and 61; the two sprockets being of the same diameter. Thus during one rotation of the main drive shaft to move the mold table one step, the shaft 62 is also given one rotation, to thereby effect one operation of the feeding and shearing mechanism. Therefore a single gob is fed to each mold. In order to effect a plural gob feed, a second sprocket 65, of the same diameter as sprocket 59, is fixed to the main drive shaft, and is operatively connected by means of a sprocket chain 66, with a sprocket 67; in the specific form illustrated this sprocket being of one half the diameter of sprocket 65. This small sprocket wheel 67 is connected with a sprocket wheel 68, of the same diameter as sprocket wheel 65; and sprocket wheel 68 is connected by means of a sprocket chain 69, with a sprocket wheel 70 of the same diameter and loosely mounted on the shaft 62 adjacent the sprocket 61. Both sprockets 61 and 70 are normally loose on the valve shaft 62, and a clutch 71, operated by lever 72, is provided for the purpose of selectively throwing either sprocket into driving connection with the valve shaft.

When the sprocket wheel 70 is in driving connection with the valve shaft, it is apparent that this shaft will make two complete revolutions during a single revolution of the main drive shaft, and consequently two gobs will be fed to each mold. To return to single gob feed it is only necessary to move the lever 72 in the opposite direction. While I have shown herein only mechanisms for feeding one or two gobs to a mold, it is apparent that suitable connections and gear shifting mechanism may be provided to effect the feeding of any desired number of gobs to each mold.

The cam mechanism for opening and closing the molds, will now be described.

Figure 7:
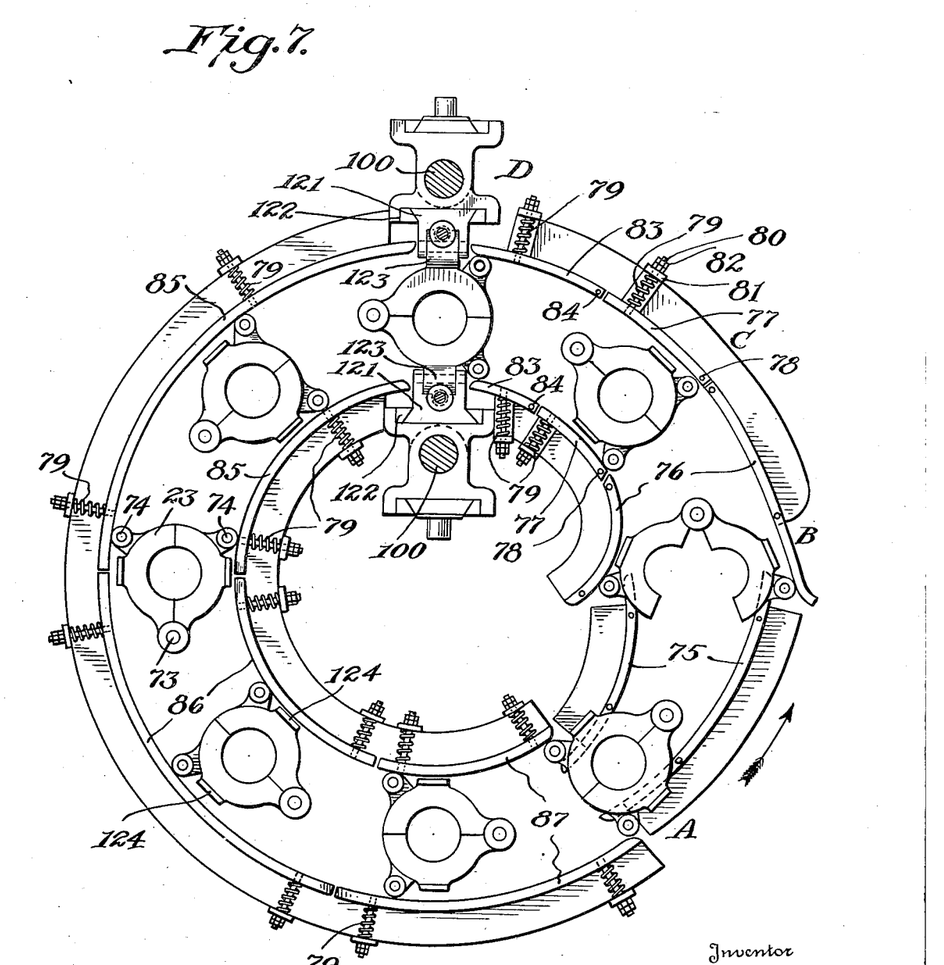
Figure 7 is a plan view of the improved cam tracks for opening and closing the molds.

The cam construction is shown in Figure 7, and as this figure is solely for the purpose of showing the cam structure, I have omitted other parts of the machine; and the cam structure has been omitted from other figures. The molds 23 are of the open and shut type, and are formed of two halves pivotally connected at 73. The mold halves are provided with the usual rollers 74, for cooperation with cam tracks for opening and closing the molds.

The molds travel step-by-step in the direction of the arrow shown on Figure 7. Assuming a mold is at position A (Fig. 7) in closed condition, and with the rollers 74 engaging the outer walls of the outwardly flared fixed cam tracks 75; then it is apparent that when the mold is moved one step it will be brought into open condition at position B. At position B the rollers engage the inner walls of the fixed converging cam tracks 76; so that when the mold is moved another step it will be brought into closed condition at position C, where a glass charge is fed to the mold. During the remainder of the complete revolution of the mold table, the molds are in closed condition, until they again reach position A. It is highly desirable, of course, that there be sufficient pressure on the mold halves to maintain them tightly closed, and where fixed cams are employed it is obvious that due to wear and tear, etc., tight joints between the mold halves will not be maintained. Accordingly there is provided cam tracks which are formed in sections; each section being spring-pressed inwardly. Referring back to position C, it will be noted that cam tracks 77, 77, are pivotally mounted at 78, 78. The opposite ends of these cam tracks are forced inwardly by means of springs 79, 79. These springs are mounted on pins 80, which are slidably carried by brackets 81; the springs being compressed between the cam track and the bracket. The nuts 82 determine the extent to which the cam tracks project inwardly.

After the molds pass from cam tracks 77, 77, they are engaged by cam tracks 83, 83, pivoted at 84, 84, and forced inwardly by springs 79, 79; the construction and arrangement being exactly the same as described in connection with tracks 77, 77. After the molds pass from tracks 83, 83, they are brought to the pressing station D. At the pressing station a special mechanism is employed for retaining the molds in tightly closed condition during the forming operation. This special mechanism will be described hereinafter in connection with the pressing apparatus.

After the molds pass from the pressing position they are engaged by cam tracks 85, 85. These cam tracks are the same as those previously described, except that they are much longer sections, and are not pivotally mounted. Instead of being pivotally mounted they are each provided with two or more springs 79 by which the two tracks are forced radially toward each other to press against the rollers 74 with sufficient pressure to cause the mold halves to fit closely.

Following the cam sections 85, 85, are two more sections 86, 86, and these are followed by two more sections 87, 87. The sections 86, 86, and 87, 87, have substantially the identical construction as sections 85, 85. After the molds leave spring pressed sections 87, 87, they are ready to be opened by means of the opening cam tracks 75, 75. Of course these sections 75, 75, are not spring pressed, as their function is to open the molds.

Obviously this feature of the invention is not limited to the specific cam structure disclosed; it being apparent that many changes and modifications may be made. By the use of these spring pressed cam tracks the molds are retained in the desired closely fitting condition, and when greater pressure is desired on the molds it is only necessary to adjust the nuts 82.

I shall now describe the mechanism for operating the pressing plunger.

Figures 3, 4:
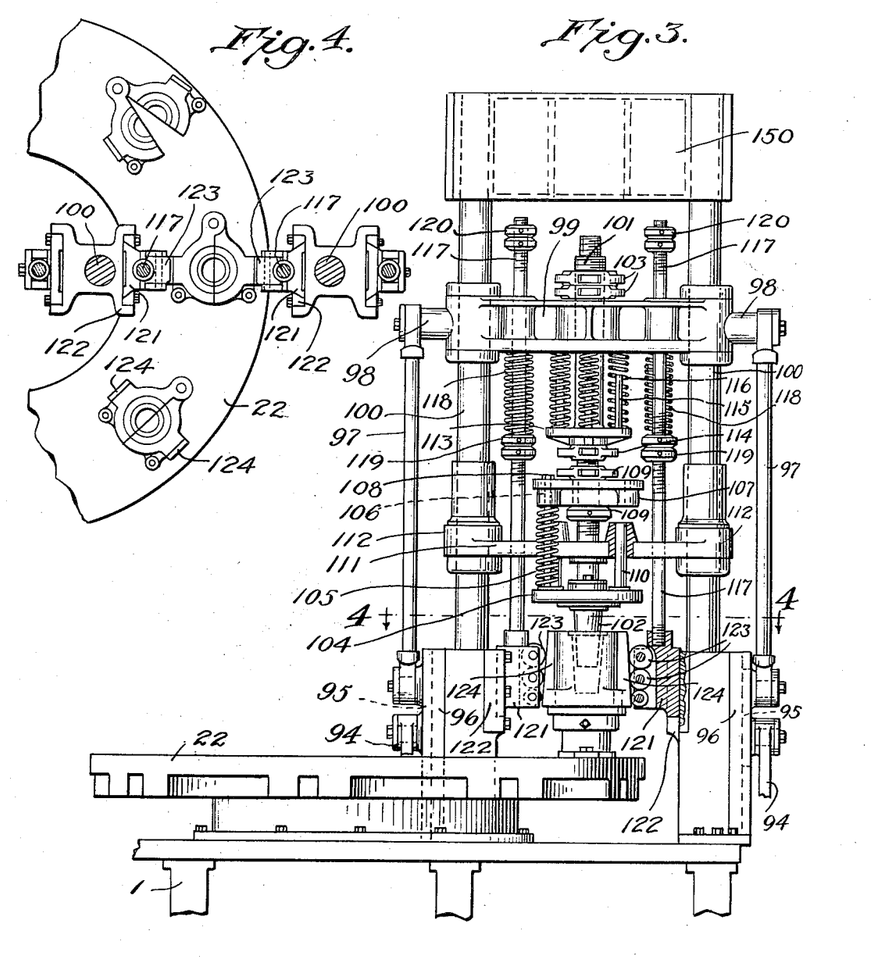
Figure 3 is a front elevational view of the pressing mechanism and the means for tightly closing the mold halves during the pressing operation; parts being shown in vertical section.
Figure 4 is a detail horizontal sectional view taken on the line 4—4 of Figure 3.

Referring particularly to Figures 1, 2 and 3, numeral 88 indicates a crank which is rotated by the main drive shaft, and which carries the crank pin 89. One end of a link 90 is mounted on the crank pin 89, and the opposite end of the link is attached to the crank arm 91 of the crank shaft 92. Thus as the crank 88 rotates the crank shaft 92 will be oscillated. The crank shaft 92 carries two crank arms 93, 93, (Fig. 1), and these crank arms are pivotally attached to the lower ends of links 94, 94; the upper ends of the links being pivotally attached to slides 95, 95, which are adapted to reciprocate in slide brackets 96, 96. Also attached to slides 95, 95, and extending upwardly therefrom, are connecting rods 97, 97, which are attached at their upper ends to outwardly projecting pins 98, 98, carried by the crosshead 99. This crosshead is mounted for sliding movement on the standards 100, 100, carried by the machine frame. By means of the mechanism thus far described, the crosshead is periodically reciprocated to press the ware. The pressing mechanism, and the means by which such mechanism is mounted on the crosshead 100, will now be described.

A rod 101 passes through the crosshead 99, and has attached to its lower end the pressing plunger 102; its upper end being threaded to receive the nuts 103, by means of which the rod and pressing plunger may be adjusted vertically and locked in adjusted position.

Slidably mounted on the rod 101, above the plunger 102, is the usual mold ring 104, which is movably held in its lowermost position by means of springs 105 mounted on pins 106 attached to the mold ring and passing through openings in the frame 107. Nuts 108 are provided on the upper ends of the pins, to limit the downward movement of the mold ring, and the frame 107 is vertically adjustable on the rod 101, by means of nuts 109, 109, to vary the pressure on the springs. The guide ring is held against rotation, and in true alignment, by means of pins 110 which are suitably guided in a spider frame 111; the spider frame being rigidly mounted on the standards 100, 100, by means of sleeves 112, 112.

By means of the above described structure, when the pressing plunger descends, the mold ring will first come into contact with the mold, and will then be held firmly against the mold by means of the springs 105, while the pressure plunger 102 continues its descent to form the article in the mold.

It is essential, of course, that some means be provided for resiliently mounting the plunger carrying rod 101, to avoid breakage of parts in case of foreign substance in the molds, and also for the purpose of varying the time of dwell of the pressing plunger in the molds. For this purpose there is provided a novel arrangement of the springs, which function in a highly efficient manner, and by which broken springs may be replaced, or springs of different strength substituted, with the greatest ease and without taking down any parts of the machine. This novel construction includes a frame member 113 which is mounted on the rod 101, and which is vertically adjustable by means of the nut 114. A number of pins 115 are attached to this frame and extend upwardly therefrom; the pins terminating a substantial distance below the crosshead 99, as clearly shown in Figures 1 and 3. Mounted on each of these pins is a spring 116, the springs seating at their lower ends on the frame 113, and abutting at their upper ends against the bottom of the crosshead 99. Obviously the number of pins 115 and springs 116, will vary in different installations.

In the operation of this feature of the machine, as the crosshead descends the pressure will be transmitted through the springs 116 to the rod 101. carrying the pressing plunger 102. In the event that some foreign substance should be in one of the molds, thereby stopping the descent of the plunger, the crosshead will continue to descend, and merely compress the springs to a further extent and without damaging or breaking any parts. Further, by adjusting the springs 116, or by substituting other springs, the time of dwell of the plunger in the molds, may be varied.

In the structure described above, if it is desired to vary the tension on the springs 116, it is only necessary to adjust the nut 114. Further, if the springs need replacement because of breakage or otherwise, it is only necessary to lower the frame 113 to relieve the pressure on the springs, and then lift the springs off the pins 115, and substitute other springs. This may be done quickly and easily and without taking down any parts of the machine, as has been necessary in prior constructions.

As mentioned hereinbefore, a special mechanism is employed for causing the mold halves to make a tight fit during the pressing operation; and this mechanism will now be described.

Referring particularly to Figure 3, numerals 117, 117, indicate two rods which are slidably mounted in the crosshead 99, and extend downwardly on opposite sides of the molds. The rods are normally forced downward by means of springs 118, 118, which are mounted on the rods, between the bottom of the crosshead and the adjusting nuts 119, 119, on the rods. Adjusting nuts 120, 120, are also mounted on the rods above the crosshead. Attached to the lower end of each rod 117 is a slide 121, which is adapted to reciprocate in a slide bracket 122 fixed to the machine frame. Mounted in each of the reciprocable slides are a number of rollers 123; the rollers gradually increasing in diameter from the bottom to the top, thereby presenting an inclined rolling surface. Instead of having the rollers of gradually increasing diameter, the rollers could all be of the same diameter but with their axes arranged in an inclined plane instead of in a vertical plane as illustrated. The inclined rolling surface cooperates with tapering or wedge-like lugs 124 provided on each side of the molds.

In the operation of this mechanism, as the crosshead descends for the pressing operation, the rods 117 will be forced downwardly by means of the crosshead acting against the springs 118, and thereby forcing the frames 121 and rollers 122 downwardly; the rollers and inclined lugs 124 cooperating to exert a wedging action on the mold halves, thereby forcing them into tightly closed position during the forming operation. After the slide frames 121 have descended as far as possible, the crosshead may continue to descend, and will merely exert a further pressure on the slide frames and mold sections.

After the articles have been completely formed and are ready to be removed, they may be elevated from the mold by an unusually simple elevator mechanism, which will now be described.

Referring particularly to Figure 5, numeral 125 indicates a crank disk fixed to the main drive shaft 18 and carrying a wrist pin 126. Loosely mounted on the press operating shaft 92, is an oscillatable arm 127, carrying at its upper end a curved cam track 128. The oscillatable arm is operatively connected with the wrist pin 126 by means of a pitman 129; and the arm is counterbalanced by means of weight 130. A plunger 131 is suitably mounted on the frame of the machine, and carries on its lower end a roller 132, adapted to ride in the curved cam track 128. A stem 133 depends from each mold bottom, and when the molds reach the discharging position the stems are in alignment with the plunger 131. So that when each mold is at the discharging station the arm 127 and cam track 128 will be moved to the left (Fig. 5), thereby lifting the plunger or elevator 131, and forcing upwardly the stem 133 and mold bottom carrying the finished article upon it, so that it may be readily removed by hand or by any desired mechanism. Further rotation of the crank disk 125 moves the cam track to the right (Fig. 5), thereby withdrawing the plunger 131 and permitting the stem 133 and mold bottom to be lowered by gravity. In the particular arrangement shown herein, the plunger 131 is not completely lowered before the mold table begins to rotate; and to prevent the stem 133 and mold bottom from dropping suddenly when they pass out of alignment with the plunger 131, there is provided an arm 134, which is rigidly attached to the upper end of the plunger 131, and which is preferably inclined slightly downward. By this means the stems and mold bottoms will be gradually lowered, thereby reducing the wear and tear on the parts, and effecting a more quiet operation.

The means for distributing cooling air to various parts of the machine, will now be described. Referring particularly to Figures 1, 2 and 8, numeral 135 indicates a wind box which receives air from a compressor (not shown) through a pipe 136. For controlling admission of air to the wind box, there is provided a slide valve 137, having the usual opening 138. A link 139 is pivotally attached at one end to the slide valve 137, and at its opposite end is pivotally attached to one arm of a bell-crank lever 140. The other arm of the bell-crank lever is provided with a rack 141 meshing with a gear 142. The gear is mounted on a shaft 143 which extends downwardly to a point for convenient operation, and is provided with a hand wheel 144. Obviously, by the rotation of the hand wheel the slide valve 137 will be adjusted to increase or decrease the amount of air supplied to the wind box. The rack arm of the bell-crank lever 140 may be provided with a curved slot 145 to receive a guide pin 145'.

A number of air supply pipes 146 lead from the wind boxes to points adjacent the parts to be cooled, such as the interior of the molds, the exterior of the molds, etc. The air supply pipes may be of various constructions. For example, the pipe 146 for supplying air to the interior of the molds (see Fig. 2) is provided at its upper end with a ball and socket joint 147, whereby the pipe may be swung out of the way when it is not in use. This pipe, as well as some of the others, also has a lower telescoping section 148, which is held in vertically adjusted position by means of a clamp 149.

The wind box 135 communicates with another wind box 150, and from this latter wind box the pipes 151 lead for cooling the pressing plunger. These pipes also preferably carry telescoping lower sections 152, which are held in vertical adjusted position by means of clamps 149. The lower ends of the telescoping sections are preferably provided with valves 153, by means of which the amount of cooling air may be controlled. However, it is desirable at times to entirely shut off the supply of cooling air to the pressing plunger, and for accomplishing this there is provided a slide valve 154 which controls communication between the main wind box 135 and the wind box 150. The slide valve 154 may be operated by means of a hand lever 155 pivotally mounted on a bracket 156 and having a slotted connection with a rod 157 attached to the slide valve. Thus by the operation of lever 155, communication between the main wind box and the wind box leading to the pressing plunger, may be regulated or be entirely shut off. It will be understood, of course, that the arrangement and construction of the wind boxes, the pipes leading to the parts to be cooled, the valves, etc., will vary in different installations.

Referring now to Figure 1, numeral 158 indicates a lever which is connected with means for operating a clutch between the crank disk 88 and the main drive shaft, by means of which clutch the driving mechanism for the pressing plunger may be rendered operative or inoperative. However, it has not been deemed necessary to illustrate or describe either the clutch or its operating means, as those elements form no part of the present invention.

The operations of the various parts of this forming machine have been described in connection with the description of the construction of the various parts of the invention, and therefore any further description of the operation is unnecessary.

What I claim as new and desire to secure by Letters Patent is:

1. A glass forming machine, including a rotary mold table, molds carried by the table, a main drive shaft for rotating the table, a glass feeding plunger, means for operating said plunger, a rotary shaft for controlling said operating means, and means for varying the number of revolutions of said rotary shaft with respect to the number of revolutions of the main drive shaft of the forming machine.

2. A glass forming machine, including a rotary mold table, molds carried by the table, a glass feeding plunger, a cylinder for operating the plunger, valves for controlling the cylinder, a rotary valve shaft for controlling the valves, a main drive shaft for rotating the mold table, driving connections between the valve shaft and the main drive shaft, and means for varying the number of complete revolutions of the valve shaft with respect to the main drive shaft.

3. A glass forming machine, including a rotary mold table, molds carried by the table, a glass feeding plunger, a cylinder for operating the plunger, valves for controlling the cylinder, a rotary valve shaft for controlling the valves, a main drive shaft for rotating the mold table, a driving connection between the two shafts to cause a complete revolution of the valve shaft for each revolution of the main drive shaft, and gear shifting means for causing said valve shaft to make a plurality of complete revolutions for each revolution of the main drive shaft.

4. A glass forming machine, including a plurality of molds, a glass feeding plunger adapted to feed gobs to the molds, and means for varying the number of gobs fed to each mold.

5. A glass forming machine, including a plurality of molds, means for controlling the feeding of glass gobs to the molds, and means for varying the number of gobs fed to each mold.

6. A glass forming machine, including a rotary mold table, a plurality of molds carried by said table, a glass feeding plunger mounted on the forming machine for feeding gobs of glass to the molds, and means for varying the number of gobs fed by the feeding plunger to each mold.

IRA H. FREESE.